(12) United States Patent
Lathim

(10) Patent No.: US 8,899,181 B2
(45) Date of Patent: Dec. 2, 2014

(54) WATER DISPENSER APPARATUS

(76) Inventor: Del Lathim, Pasco, WA (US)

( * ) Notice: Subject to any disclaimer, the term of this patent is extended or adjusted under 35 U.S.C. 154(b) by 132 days.

(21) Appl. No.: 12/946,734

(22) Filed: Nov. 15, 2010

(65) Prior Publication Data

US 2011/0114026 A1    May 19, 2011

Related U.S. Application Data

(60) Provisional application No. 61/262,818, filed on Nov. 19, 2009.

(51) Int. Cl.
*A01K 7/00* (2006.01)
*A01K 7/02* (2006.01)

(52) U.S. Cl.
CPC ........................................ *A01K 7/02* (2013.01)
USPC ............................................................ 119/72

(58) Field of Classification Search
CPC .......... A01K 39/02; A01K 39/04; A01K 7/02
USPC .................. 119/51.5, 72, 74, 77, 61.5, 61.54; D30/121, 122; 222/185.1
See application file for complete search history.

(56) References Cited

U.S. PATENT DOCUMENTS

| | | | | |
|---|---|---|---|---|
| 1,186,369 A * | 6/1916 | Barlow | ......................... | 222/586 |
| 1,533,627 A * | 4/1925 | Averill | ......................... | 222/586 |
| 1,815,964 A * | 7/1931 | Boyer | ............................. | 119/77 |
| 1,816,684 A * | 7/1931 | Liechty | ........................... | 119/77 |
| 4,573,434 A * | 3/1986 | Gardner | ......................... | 119/77 |
| 5,259,336 A * | 11/1993 | Clark | ........................... | 119/51.5 |
| 5,273,083 A * | 12/1993 | Burrows | ........................ | 141/18 |
| D350,842 S * | 9/1994 | VanSkiver | .................. | D30/121 |
| 6,863,025 B2 * | 3/2005 | Ness | ............................... | 119/72 |
| 7,234,418 B2 * | 6/2007 | Fort et al. | ........................ | 119/72 |
| 2006/0231040 A1 * | 10/2006 | Bast et al. | ....................... | 119/77 |

* cited by examiner

*Primary Examiner* — David Parsley
*Assistant Examiner* — Danielle Clerkley
(74) *Attorney, Agent, or Firm* — Rainier Patents, P.S.; Paul W. Mitchell; Remembrance Newcombe

(57) ABSTRACT

This patent application relates to water dispensing apparatus. One example includes a container receiving portion configured to receive a water container. This example also includes a water presentation portion configured to receive water from the container receiving portion for consumption by an animal.

10 Claims, 5 Drawing Sheets

WATER DISPENSER APPARATUS 100

WATER DISPENSER APPARATUS 100

WATER DISPENSER APPARATUS

PRIORITY

This patent application is a non-provisional utility application that claims priority from a provisional application having Ser. No. 61/262,818 filed on Nov. 19, 2009.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

The present description relates to a water dispenser apparatus or "waterer" that automatically supplies fresh water for consumption by an animal. For example, the water dispenser apparatus can be utilized as a waterer for domestic cats and/or dogs, among others.

Figure 1:
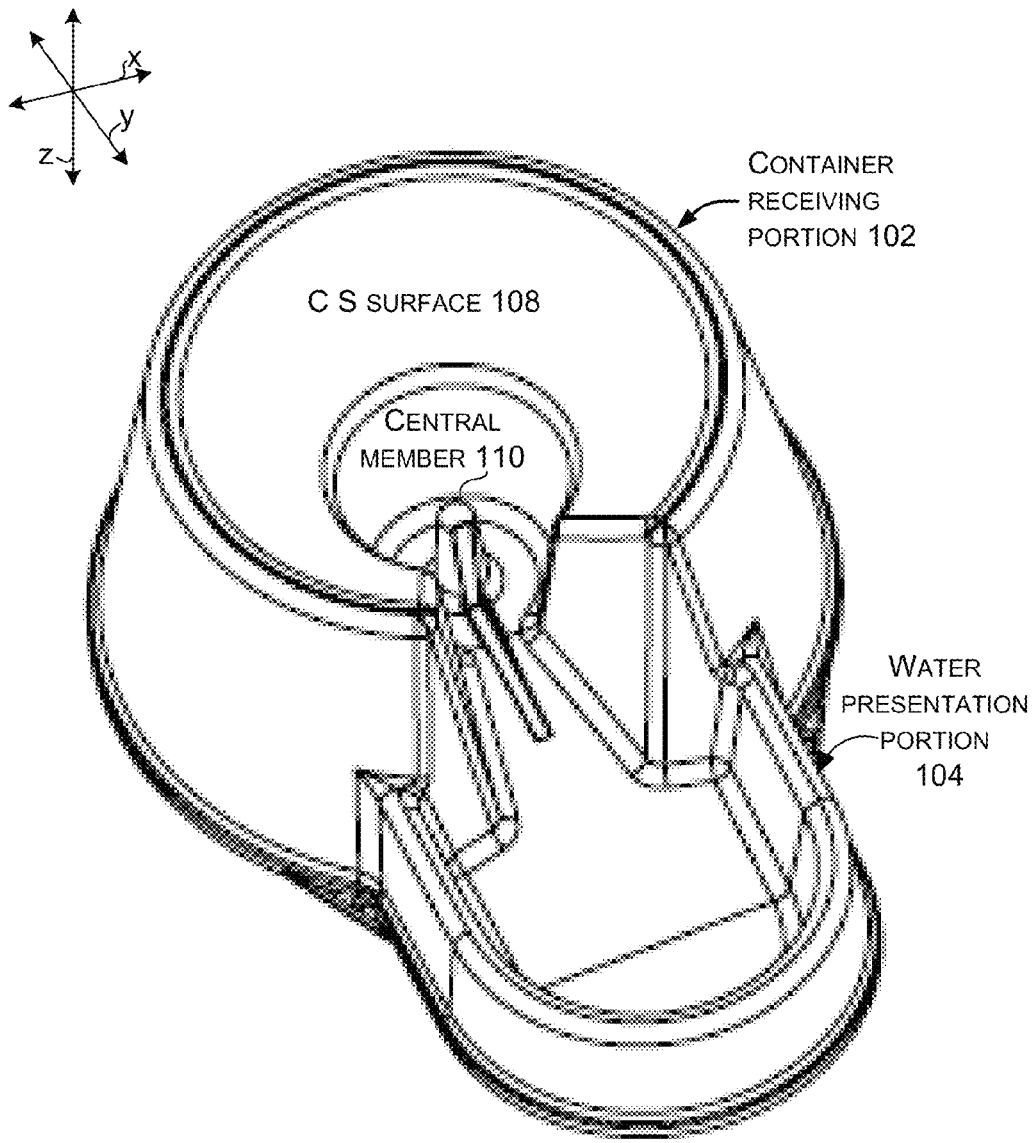
FIGS. 1-2 are perspective views of an example of a water dispensing apparatus in accordance with some of the present concepts.
Figure 2:
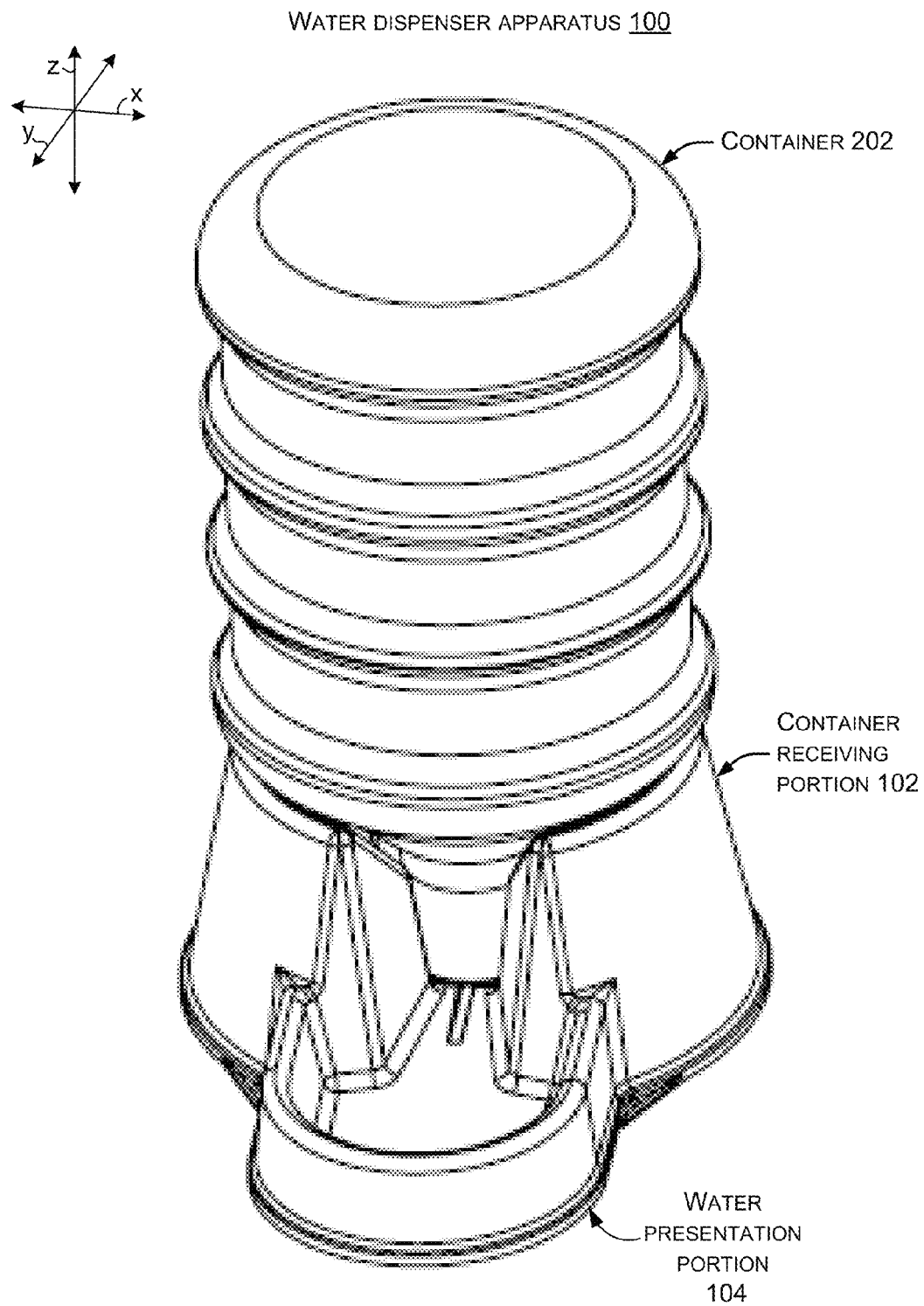

FIGS. 1-2 collectively show an example of a water dispenser apparatus 100 which can include a container receiving portion 102 and a water presentation portion 104. Container receiving portion 102 can be configured to receive a commercially available water container 202. Water presentation portion 104 can be in a water receiving relationship with the container receiving portion 102 so that water from container 202 (FIG. 2) can be available for consumption by an animal from the water presentation portion 104.

Container receiving portion 102 can include a container support surface 108 and a control mechanism that is configured to control water outflow from the container 202. In this case, the control mechanism is manifest as a central member 110 that is configured to be forced into a mouth or lid portion of the container 202. The central member 110 can be manifest in various shapes. In the illustrated configuration, central member 110 is frustum or can be characterized as being frusto-conical in nature.

Figure 3:
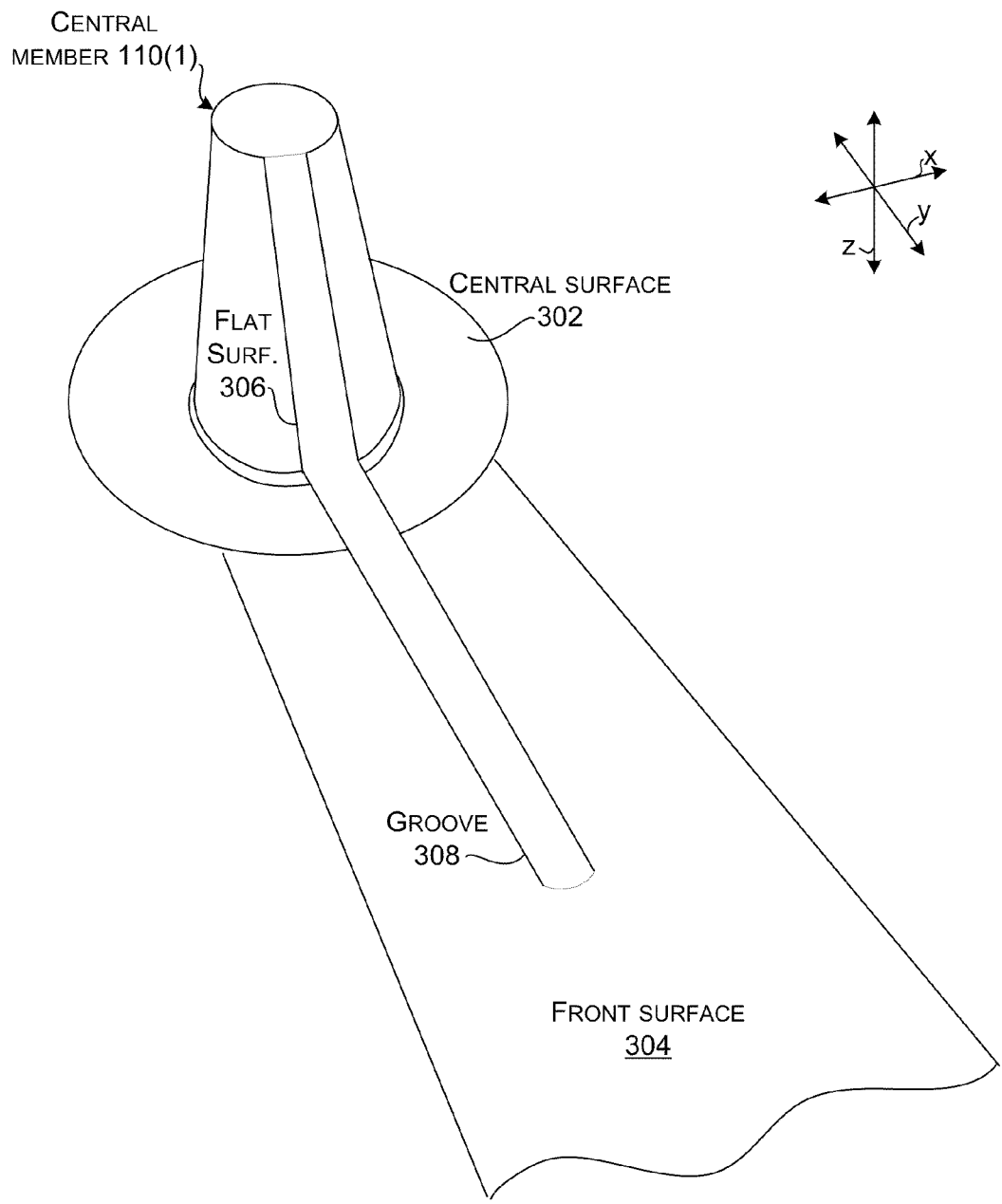
FIG. 3 is a perspective view of a portion of a water dispensing apparatus in accordance with some of the present concepts.

FIG. 3 shows a detailed view of one version of a central member 110(1). In this case, central member 110(1) extends upwardly from central surface 302. The central surface transitions into front surface 304 that extends into the water presentation portion 104 (FIGS. 1-2). In the illustrated configuration, central member 110(1) is a frustum, which is but one possible shape. In this particular configuration, the central member can be characterized as being frusto-conical in nature. In this instance, central member 110(1) further has a flat surface 306. Further, a groove 308 is formed into front surface 304. Groove 308 terminates into flat surface 306. Groove 308 and flat surface 306 operate cooperatively to allow air to be drawn into the container to maintain a water level of the water presentation portion. Accordingly, other structures and/or other geometric configurations can be employed relative to groove 308 and flat surface 306 to regulate a water level of the water presentation portion.

Figure 4:
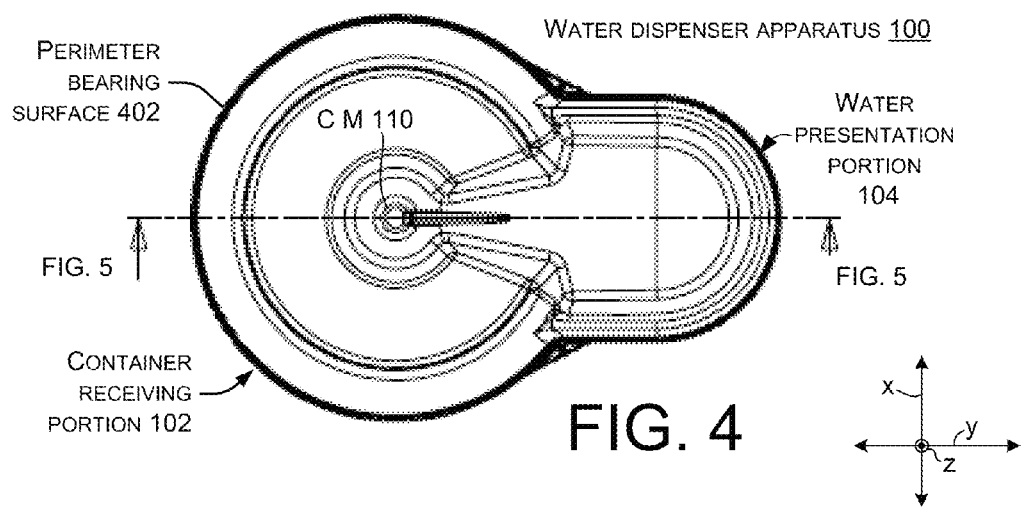
FIG. 4 is a top view of an example of a water dispensing apparatus in accordance with some of the present concepts.
Figure 5:
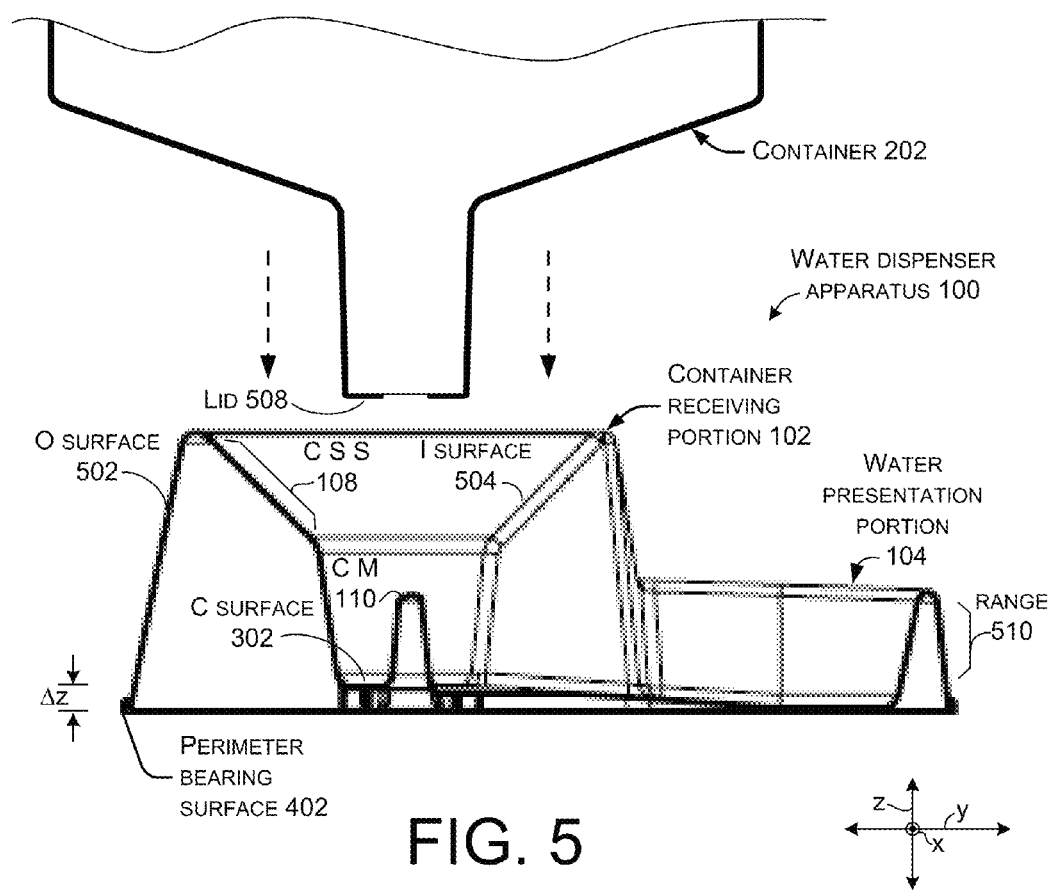
FIG. 5 is a sectional view as indicated in FIG. 4 of an example of a water dispensing apparatus in accordance with some of the present concepts.

FIGS. 4-5 collectively illustrate additional features of water dispenser apparatus 100. FIG. 4 shows a top view of water dispenser apparatus 100 and indicates a cross-sectional orientation of FIG. 5. For purposes of explanation, FIG. 5 further shows a portion of container 202 above and ready for installation upon water dispenser apparatus 100.

In this configuration, container receiving portion 102 extends upwardly from perimeter bearing surface 402 via an outer surface 502. The perimeter bearing surface can be configured to contact a bearing surface such as a floor upon which water dispenser apparatus 100 is positioned. At the top of the container receiving portion 102, the outer surface 502 transitions to an inner surface 504. The inner surface 504 connects to and supports central surface 302 and thereby central member 110. Container support surface 108 forms a portion of inner surface 504 and is configured to contact container 202. In this particular configuration, the inner surface 504 suspends the central surface 302 a distance $\Delta z$ above perimeter bearing surface 402. In various implementations, distance $\Delta z$ can range from about 1/64 inch to about 1/4 inch, among other values. Some specific implementations can utilize a range of about 1/32 inch to about 1/8 inch.

Initially, as a user installs the container 202 on the water dispenser apparatus, central member 110 can contact a lid portion or lid 508 of the container. As the user lowers the container a large force can be temporarily imparted on the central member 110. The present implementation is flexible in a manner that can decrease peak forces imparted on the central member 110. For instance, by suspending the central member 110 in the z-direction away from a bearing surface (i.e., the floor) downward forces imparted on the central member 110 and/or central surface 302 can force the central member 110 and the central surface 302 downward until they contact the bearing surface. This can function to decrease peak forces imparted on the central member 110 and/or central surface 302 and thereby reduce and/or avoid failure of the central member.

Further, container receiving portion 102 can be configured such that during this downward travel of the central member 110 and the central surface 302 the container 202 can contact container support surface 108 so that the container is collectively supported by central member 110, central surface 302 and/or container support surface 108. At this point, distance $\Delta z$ can be less than its initial value and in some cases can be reduced to zero so that central surface 302 is flush with perimeter bearing surface 402.

Viewed another way, central member 110 can be resiliently upwardly biased. Dropping a full container 202 of water onto the central member can temporarily overcome this bias either partially or fully. For instance, the bias may be overcome momentarily as the full container is installed and/or until some or all of the water is used from the container.

Upon receipt of container 202, water can controllably dispense from the container to a level below a top surface of the water presentation portion 104. As water is drawn down by animal consumption and/or evaporation air will enter the container via groove 308 and flat surface 306 (both of FIG. 3) to allow further water to be dispensed. Accordingly, a desirable water level range 510 can be automatically maintained by the water dispenser apparatus 100 until the container is empty and ready to be changed.

Note also that the slanted nature of surfaces on water dispenser apparatus 100 can allow the water dispenser apparatus to be nestably stackable with other water dispenser apparatus to reduce shipping costs. For instance, in this case, outer surface 502, inner surface 504 and central member 110 are all configured to allow multiple water dispenser apparatuses to be stacked upon one another in a nested manner.

Figure 6:
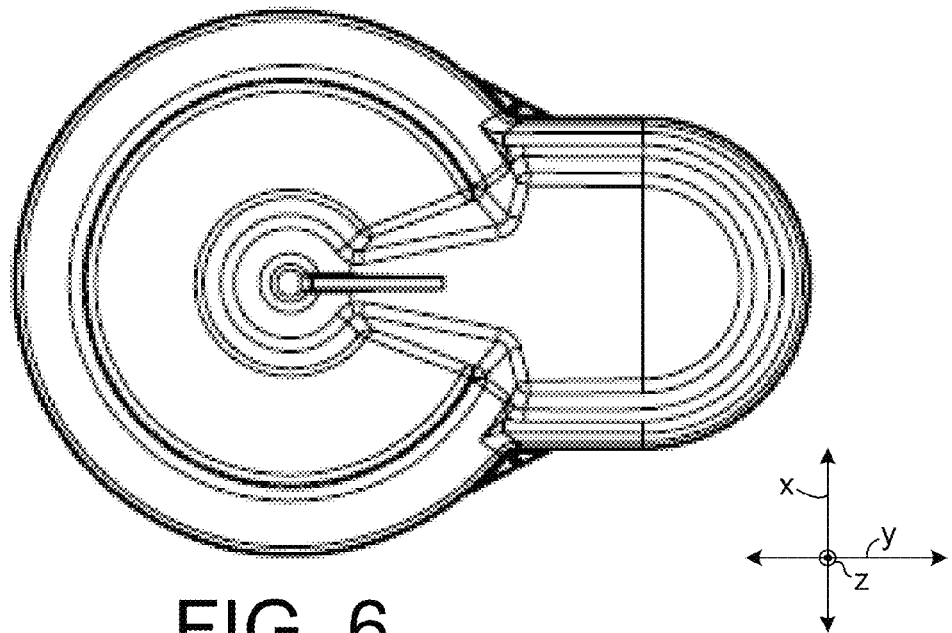
FIG. 6 is a top view of an example of a water dispensing apparatus in accordance with some of the present concepts.
Figure 7:
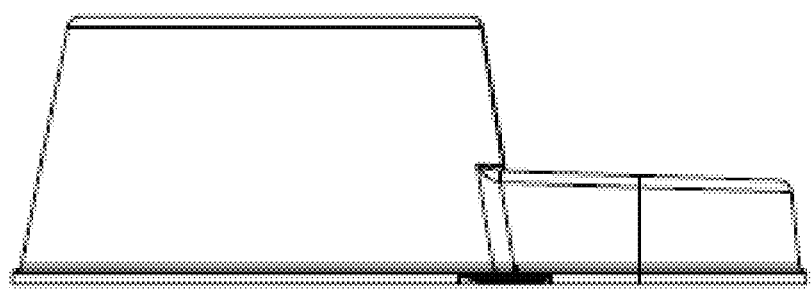
FIG. 7 is an elevational view of an example of a water dispensing apparatus in accordance with some of the present concepts.

FIGS. 6-7 illustrate that in at least some configurations, surfaces of water dispenser apparatus 100 can be blended into one another. Blended surfaces tend to be easy to clean and can reduce and/or avoid difficult to clean corners where dirt and/or algae may persist and threaten the health of the animal.

Water dispensing apparatus 100 can be constructed of any suitable material such as a polymer, plastic, or composite. Any traditional fabrication technique, such as injection molding can be utilized to form the water dispensing apparatus.

In summary, the present implementations can allow a user to easily control the water that is provided for their animals by utilizing the same type of containers that the user may already have delivered for human consumption. The water is auto-dispensed for the animal by a durable, easy to clean, water dispensing apparatus.

CONCLUSION

Although specific examples of water dispensing apparatus are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A water dispensing apparatus, comprising:
a container receiving portion configured to receive a water container that includes a lid portion, the container receiving portion including a central member configured to be forced against and through the lid portion of the water container during installation and to extend into and at least partially support the installed water container while allowing water to be released from the installed water container, the central member being generally frusto-conical in shape and being formed as a single piece with the container receiving portion; and,
a water presentation portion configured to receive the water from the container receiving portion for consumption by an animal,
wherein the container receiving portion includes an outer surface and an inner surface, the inner surface comprised of:
an upper section which is a container support surface with a generally inverted conical shape, a top of the container support surface open relatively wide to receive the water container and a bottom open relatively narrow, wherein the container support surface is configured to at least partially support the installed water container, and
a lower section connected to the bottom of the upper section, the bottom of the lower section connected to a central surface, the central surface connected to the central member, wherein the lower section has a generally inverted conical shape with walls that are closer to vertical than the container support surface, and further wherein the lower section in combination with the central member is configured to receive and align a neck of the water container,
and further wherein the upper section, the lower section, the central member, and the outer surface of the container receiving portion and inner and outer supporting sidewalls of the water presentation portion have slanted surfaces that form oblique angles relative to the central surface, such that the water dispensing apparatus is nestably stackable with a second water dispensing apparatus.

2. The water dispensing apparatus of claim 1, wherein the central member is resiliently biased away from a bearing surface upon which the water dispensing apparatus is positioned.

3. The water dispensing apparatus of claim 1, comprises a single piece or multiple pieces.

4. The water dispensing apparatus of claim 1, produced by a molding process.

5. The water dispensing apparatus of claim 1, comprises a polymer, plastic, or composite.

6. The water dispensing apparatus of claim 1, wherein the central member includes a nearly vertical flat surface extending downward to a groove formed in a front surface of the water presentation portion such that air can travel up the groove and the flat surface into the water container to allow water to be dispensed from the water container until the groove is covered.

7. The water dispensing apparatus of claim 1, wherein the container support surface, the central surface, and the central member are configured to collectively support the installed water container.

8. A water dispensing apparatus, comprising:
a container receiving portion that includes a generally horizontal central surface that extends between an elongate, generally frusto-conical central member extending upwardly from the central surface and an inner surface, the inner surface extending upwardly around the central member to an outer surface, wherein the container receiving portion is configured to receive a sealed water container such that the central member is forced against a lid portion of the water container to allow water to be released from the installed water container, and further wherein the container receiving portion and the central member are formed as a single piece; and,
a water presentation portion configured to receive the water from the container receiving portion for consumption by an animal,
wherein the inner surface further comprises:
an upper section that is a container support surface with a generally inverted conical shape, a top of the container support surface open relatively wide to receive the water container and a bottom open relatively narrow, wherein the container support surface is configured to at least partially support the installed water container, and
a lower section connected to the bottom of the upper section with a generally inverted conical shape with walls that are closer to vertical than the container support surface, wherein the lower section is configured to receive and align a neck of the water container,
and further wherein the central member and the inner surface of the container receiving portion, inner sidewalls of the water presentation portion, and the outer surface have slanted surfaces that form oblique angles relative to the generally horizontal central surface, such that the water dispensing apparatus is nestably stackable with a second water dispensing apparatus.

9. A water dispensing apparatus, comprising:

a container receiving portion that includes a generally horizontal central surface that extends between a generally frusto-conical, elongate central member extending upwardly at an oblique angle from the central surface and an inner surface, the inner surface extending upwardly at an oblique angle around the elongate central member to a slanted outer surface, the generally horizontal central surface and the elongate central member formed as a single piece; and, a water presentation portion configured to receive water from the container receiving portion for consumption by an animal, wherein the inner surface further comprises:

a slanted upper section which is a container support surface with a generally inverted conical shape, a top of the container support surface open relatively wide to receive a water container and a bottom open relatively narrow, wherein the container support surface is configured to at least partially support the installed water container, and a slanted lower section connected to the bottom of the slanted upper section with a generally inverted conical shape with walls that are closer to vertical than the container support surface, wherein the slanted lower section is configured to receive and align a neck of the water container, and further wherein the elongate central member, the inner surface, inner sidewalls of the water presentation portion, and the outer surface have a slanted nature relative to the generally horizontal central surface, such that an inner cavity of the elongate central member is able to nestably receive a central member of a second water dispensing apparatus when the water dispensing apparatus is stacked over the second water dispensing apparatus.

10. The water dispensing apparatus of claim 9, wherein the oblique angle of the central member and the oblique angle of the inner surface are the same or different angles relative to the central surface.

* * * * *